United States Patent [19]

Mihelic et al.

[11] 4,366,064
[45] Dec. 28, 1982

[54] TREATMENT OF BLAST FURNACE WASTEWATER

[75] Inventors: Edward L. Mihelic, Murrysville; Samuel B. Schlosberg, Monroeville, both of Pa.

[73] Assignee: United States Steel Corporation, Pittsburgh, Pa.

[21] Appl. No.: 318,303

[22] Filed: Nov. 5, 1981

Related U.S. Application Data

[63] Continuation of Ser. No. 202,266, Oct. 30, 1980, abandoned.

[51] Int. Cl.$^3$ .............................................. C02F 1/76
[52] U.S. Cl. .................................. 210/668; 210/669; 210/743; 210/746; 210/754
[58] Field of Search ............... 210/694, 739, 743, 746, 210/754, 755, 756, 663, 664, 668, 669

[56] References Cited

U.S. PATENT DOCUMENTS

| | | | |
|---|---|---|---|
| 3,394,080 | 7/1968 | Hoffman | 210/746 |
| 3,455,820 | 7/1969 | Joyce | 210/666 |
| 3,732,164 | 5/1973 | Pressley | 210/756 |
| 3,733,266 | 5/1973 | Bishop | 210/754 |
| 3,760,829 | 9/1973 | Schuk | 210/739 |
| 3,920,419 | 11/1975 | Schroeder | 55/70 |
| 4,053,403 | 10/1977 | Bachhofer | 210/754 |
| 4,056,469 | 11/1977 | Eichenhofer | 210/756 |
| 4,137,166 | 1/1979 | Heimberger | 210/756 |

FOREIGN PATENT DOCUMENTS

| | | | |
|---|---|---|---|
| 1079423 | 6/1980 | Canada | 210/754 |
| 45-12911 | 5/1970 | Japan | 210/746 |

Primary Examiner—Ernest G. Therkorn
Attorney, Agent, or Firm—William L. Krayer

[57] ABSTRACT

Wastewater, particularly blowdown from a recycle gas-scrubbing and gas-cooling system of a blast furnace, is treated in a two-stage chlorination unit, the first stage including a chlorine addition at a pH of about 8.5 to about 10, preferably 9-9.5, and the second stage continuing the chlorination reaction at a pH of about 6 to about 8, preferably 7-7.5, while monitoring the oxidation-reduction potential of the second stage to utilize as a control point for chlorine addition in the first stage. Various contaminants, notably the nitrogen-containing compounds, are destroyed in the chlorination steps. A caustic or lime pretreatment is preferred for scale control at a pH of about 10.5 to about 11, preferably 10.7, while lime pretreatment is performed at a pH of about 9.6 to about 10, preferably 9.8. After chlorination, the process stream is preferably passed through activated carbon to remove organics.

5 Claims, 1 Drawing Figure

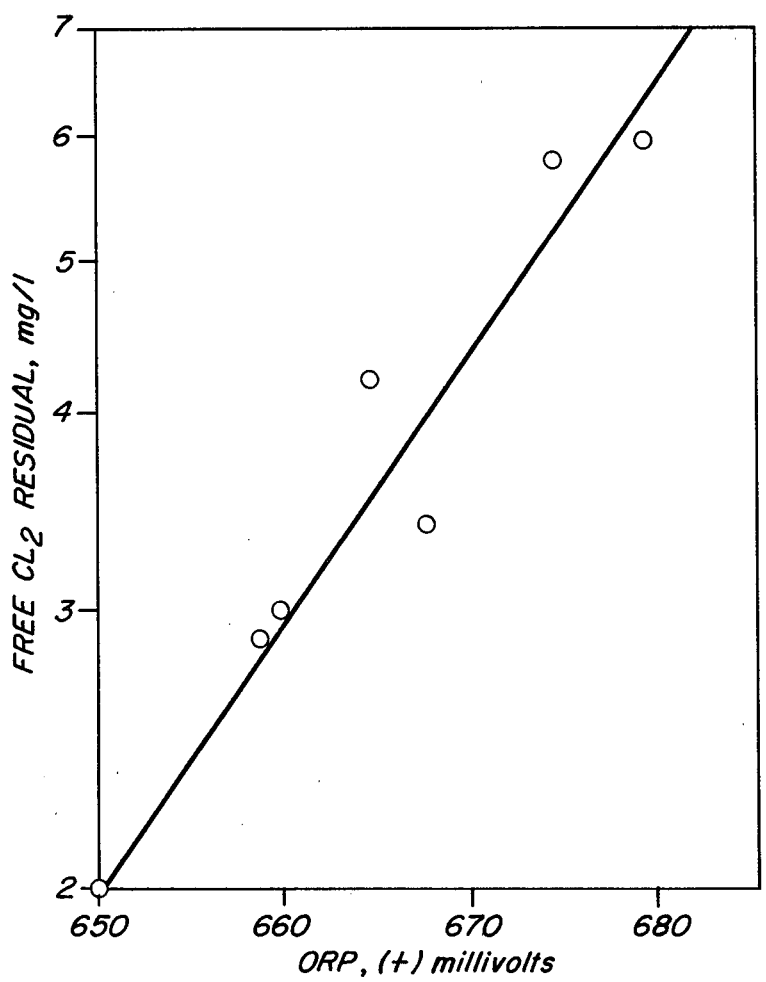

TREATMENT OF BLAST FURNACE WASTEWATER

This is a continuation of application Ser. No. 202,266, filed Oct. 30, 1980, now abandoned.

BACKGROUND OF THE INVENTION

Prior to the present invention, it has been known to use oxidation-reduction potential ("ORP", or redox potential) for the control of cyanide destruction by chloride oxidation in blast furnace gas washing effluent. See Myatt, Aston and Johnson, 46 Iron & Steel International No. 5, October, 1973. It has also been known to use breakpoint chlorination for ammonia-nitrogen ($NH_3$—N) removal from wastewater. See EPA Publication 670/2-73-058, September, 1973 "Ammonia-Nitrogen Removal by Breakpoint Chlorination", by Pressley, Bishop, Pinto and Cassel, and related U.S. Pat. Nos. 3,732,164; 3,733,266, and 3,760,829.

U.S. Pat. No. 3,920,419 describes the removal of ammonia from ammonia-containing liquor by a process that consists of automatically adjusting the pH of the liquor by the continuously controlled addition of sodium hydroxide (NaOH) solution in sufficient quantity to maintain the pH at a minimum value of 10.5, stripping ammonia from the liquor by passing a counter-current stream of air through a packed column at a temperature of 60° to 82° C. (140° to 180° F.), and controlling the A/L ratio over the preferred range of 0.37 to 0.74 cubic meters per liter ($m^3/l$) (50 to 100 cubic feet per gallon) so that at least 99% of the ammonia is removed from the liquor. The application of such a process to blast furnace blowdown would require large quantities of energy, especially during the winter months, to warm the blowdown and the stripping air and, thus, to maintain the recommended column temperature. The relative volatility of ammonia may be affected by the various other components dissolved in the blowdown. Finally, because the blowdown $NH_3$—N concentration of blast furnace wastewater may be expected to be approximately 100 mg/l, whereas the patented process describes stripping ammonia liquors containing 4000 to 6500 mg/l, the claimed nitrogen removal efficiency of at least 99% would probably not apply.

It is also conventional to remove organic materials of various kinds from water through adsorption on activated carbon. See U.S. Pat. No. 3,455,820 and, particularly, Bauer and Snoeyink, "Reactions of Chloramines with Active Carbon", Journal Water Pollution Control Federation, Vol. 45, No. 11, November, 1973, p. 2290.

Osantowski and Geinopolos described a two-stage chlorination-oxidation process (EPA Symposium on Iron and Steel Pollution Abatement Technology, Chicago, Ill., Oct. 31, 1979) but no data are disclosed concerning the pH at which the second stage is maintained or the method of controlling the chlorination.

So far as we are aware, however, no one has succeeded, prior to our efforts, in conducting a two-stage chlorination-oxidation process wherein the first stage is maintained at a pH greater than about 8.5 and the second stage at a pH about 6-8 (preferably 7-7.5) and wherein the chlorine addition to the first stage is controlled by the redox potential in the second stage. We have found that the chlorination process efficiently removes the nitrogen-containing compounds without the detectable formation of chlorophenols, and other organics are efficiently removed by the activated carbon; cyanides, thiocyanates, and other highly undesirable materials such as chloramines and halomethanes are also destroyed or adsorbed. If granular activated carbon is used, it may be regenerated in a known manner.

Breakpoint chlorination of municipal wastewater followed by activated-carbon treatment has been studied by a number of workers. In these studies $NH_3$—N concentrations were about 30 mg/l or less. The presence of other chlorine ($Cl_2$) demanders found in blowdown from blast furnaces, particularly cyanide and thiocyanate, is not of immediate concern to persons working with municipal wastewater. The chemistry and kinetics of the reaction of aqueous ammonium systems with chlorine to yield mono-, di-, and trichloramines as a function of pH have been well documented since the work of A. E. Griffin, and N. S. Chamberlin, "Some Chemical Aspects of Break-Point Chlorination", J. NEWWA, Vol. 55, 1941, p. 371; A. E. Griffin, "Chlorine for Ammonia Removal", 5th Annual Water Conference Proc. Engrs. Soc., Western Pennsylvania, 1944, p. 27, and I. Weil and J. C. Morris, "Kinetic Studies on Chloramines", J. Amer. Chem. Soc., Vol. 71, 1949, p. 1664. There is general agreement that the steps involved in the removal of ammonia by breakpoint chlorination are 1. $Cl_2 + H_2O \rightarrow HOCl + HCl$ 2. $NH_4^+ + HOCl \rightarrow NH_2Cl + H_2O + H^+$ 3. $2NH_2Cl + HOCl \rightarrow N_2 + 3HCl + H_2C$

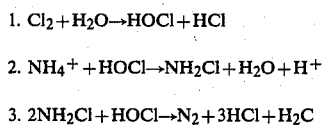

To favor this sequence and to avoid formation of the undesirable side products, di- and trichloramines, the reaction is controlled at a pH between 5.8 and 9.5 and preferably between 6.0 and 8.0. T. A. Pressley, et al, "Ammonium Nitrogen Removal by Break-Point Chlorination", Environ. Sci. Technol., Vol. 6, 1973, p. 622. A. T. Palin, "A Study of the Chloro Derivatives of Ammonia and Related Compounds with Special Reference to Their Formation in the Chlorination of Natural and Polluted Waters", Water and Waste Eng., 1950, p. 151, reports a pH range of 7.0 to 8.5 as being optimum for monochloramine formation.

The alkaline chlorination of cyanide-bearing wastewaters is also well known technology. It is based on the reaction of cyanide to form cyanogen chloride, which at a pH above 8.5 is hydrolyzed to cyanate. The rate of hydrolysis increases with increasing pH. At pH below 8.5, the rate is slow, and the escape of toxic cyanogen chloride to the atmosphere is of some concern. Therefore, it is evident that at pH favoring the removal of $NH_3$ by optimum monochloramine formation, the hydrolysis of cyanogen chloride to cyanate is suppressed. This point becomes a consideration in the chlorination of blast-furnace blowdown that contains both these contaminants.

The efficiency of activated carbon to remove residual chlorine, chloramines and organics from chlorinated wastewater has been studied. See P. F. Atkins, et al., "Ammonia Removal by Physical-Chemical Treatment", Jour. Water Poll. Control Fed., Vol. 45, No. 11, 1973, p. 2372; R. C. Bauer and V. H. Snoeyink, "Reactions of Chloramines with Active Carbon", Jour. Water Poll. Control Fed., Vol. 45, No. 11, 1973, p. 2291; V. Magee, "The Application of Granular Activated Carbon for Dechlorination of Water Supplies", Proc. Soc.

Water Test. and Exam., Vol. 5, 1956, p. 17; D. G. Hager and M. E. Flentye, "Removal of Organic Contaminants by Granular Carbon Filtration", Jour. Amer. Water Works Assn., Vol. 57, 1965, p. 1440; A. W. Lawrence, et al., "Ammonia-Nitrogen Removal from Wastewater Effluents by Chlorination", Paper presented at 4th Mid-Atlantic Industrial Waste Conf., Univ. of Delaware, Newark, Del. (Nov. 19, 1970); and R. A. D'Agostaro, "An Investigation into the Mechanisms of Nitrogen Removal from Aqueous Solution Utilizing Chlorination Followed by Activated Carbon Contact", M. S. Thesis, Cornell University, Ithaca, N.Y., 1972 found some of the chloramines to be reconverted to $NH_3$ upon carbon treatment. Atkins and co-workers, P. F. Atkins et al, "Ammonia Removal by Physical-Chemical Treatment", Jour. Water Poll. Control Fed., Vol. 45, No. 11, 1973, p. 2372, found that carbon treatment eliminated all chloramines and free chlorine and left the effluent essentially void of residual chlorine.

SUMMARY OF THE INVENTION

Our invention is based upon a correlation of breakpoint chlorination to redox potential of the wastewater during treatment; however, it requires also that the chlorination take place in two stages, at two distinctly different pH levels. It is useful with or without air stripping and with or without treatment of the wastewater to prevent or inhibit scale formation.

The FIGURE is a plot of data showing the relationship of ORP with free-$Cl_2$ residual. At some ORP values below $\sim(+)600$-mV, breakpoint chlorination is not attained. Table I illustrates that use of a high $Cl_2/NH_3$ ratio in a single stage system at pH 9.5 does not reduce the $NH_3$—N effluent concentration to desired levels with a retention time of twenty minutes. Further investigation revealed that the $NH_3$—N detected in the effluent was due to $NH_3$ produced by hydrolysis of cyanate ion during acid stabilization performed prior to analysis and indicated the need for a two-stage chlorination system.

TABLE I

Results* Obtained in Continuous Single-Stage Chlorination-Dechlorination Tests at pH of 9.5 and Retention Time of 20 Minutes
(Initial $NH_3$—N = 11 mg/l)

| $Cl_2/NH_3$ Wt Ratio | 9.5 | 10.5 | 10.5 | 13 |
|---|---|---|---|---|
| Influent to Carbon | | | | |
| $Cl_2$ Total | ND[1] | 5.7 | 6.7 | 33.5 |
| Free | ND | ND | 0.0 | 12.3 |
| Combined | ND | ND | 6.7 | 21.2 |
| Effluent From Carbon | | | | |
| $Cl_2$ Total | 2.1 | 1.4 | 0.1 | 0.0 |
| $NH_3$—N | 5.6 | 5.7 | 3.8 | 4.1 |
| $CN_T$ | 0.57 | 0.70 | 0.94 | 0.86 |
| Phenol | 0.01 | 0.01 | <0.01 | <0.01 |
| SCN | 0.10 | 0.55 | 0.47 | 0.60 |

*All values in mg/l.
[1]Not determined.

Although alkaline chlorination for cyanide destruction in blast-furnace gas-scrubbing water is known, a survey of the literature showed that break-point chlorination for removal of ammonia has been studied only for municipal wastewater containing up to 30 milligrams per liter (mg/l) ammonia nitrogen ($NH_3$—N) and in which phenol, cyanide (CN), cyanate (CNO), and thiocyanate (SCN) were of no concern. The blowdown from blast furnaces may be expected to contain as high as 100 mg/l $NH_3$—N and CN, CNO, SCN, and phenol in significant concentrations.

Initial work on the application of our process to blast furnace blowdown was performed in laboratory equipment. This blowdown treatment consisted of a two-stage chlorination, followed by filtration and activated-carbon treatment. The first stage of chlorination was conducted at pH 9.5 for destruction of $NH_3$—N, phenol, CN, and SCN. The second stage, at pH 7.5, effected the removal of the CNO originally present and that formed during the oxidation of CN and SCN in the first stage. The destruction of CNO is necessary because this species undergoes acidic hydrolysis to ammonium salts. Analysis of a CNO-containing water sample, after acid stabilization as prescribed by standard methods, would, therefore, reflect an $NH_3$—N content representing both ammonia originally present and that formed from CNO. If CNO is not removed from chlorinated blowdown, excessive amounts of $NH_3$—N will be found in the discharge.

The lower pH (7.5) in the second stage reactor increases the rates of hydrolysis of CNO and of breakpoint chlorination of the liberated ammonia and, incidentally, produces an effluent with a pH in the allowable discharge range.

The filtration served to remove suspended solids originally present in the blowdown and those formed during the chlorination. The activated-carbon treatment served to destroy residual chlorine in the chlorinated water and to adsorb any surviving organic compounds prior to discharge of the blowdown. Automatic control for chlorine feed, a solution of sodium hypochlorite (NaOCl), was accomplished via the oxidation-reduction potential (ORP) measured in the second-stage chlorination vessel. Because of the complexity and continually changing composition of blowdown from an operating system, it was necessary to study the laboratory-developed process in the field with a blowdown such as might be produced at a large steel mill.

A pilot unit was designed on the basis of the experience with the laboratory bench-scale apparatus and installed where a blast-furnace water-recycle system is in operation. One of the aims of the pilot study was to determine whether the ORP control method would be applicable to a blowdown for which the composition varied with time. Other aims were to determine the total adsorption capacity of the carbon, the regenerability of the spent carbon, and the ability of the carbon to remove chlorinated organic compounds formed during the reaction. Further aims of the pilot-unit study were to aid in developing design parameters for plant construction, to estimate usage levels of chemicals for plant-scale operations, to evaluate treated-water quality, and to obtain projected contaminant mass loadings for the steel mill outfall.

MATERIALS AND EXPERIMENTAL WORK

Materials

The final version of the pilot unit consisted of a pre-treater, a clarifier, a first-stage chlorinator, a second-stage chlorinator, a mixed-media filter, and three carbon columns in series.

The pretreater consisted of the 2-liter mixing reservoir for mixing the incoming water with 8% aqueous sodium hydroxide (NaOH) and a solution containing 1 g/l phenol. The clarifier was a 208-liter (55-gallon) steel drum. A level-control valve, maintaining a constant level in the clarifier, controlled the flow of water into the mixing reservoir. A pH electrode, located in the center inlet pipe to the clarifier into which the mixing reservoir overflowed, sensed the pH of the reservoir effluent. This pH signal was fed to a controller with on/off control of the pump feeding the NaOH solution to the mixing reservoir. When lime was used, it was added as a 2.5% aqueous slurry to a 12.5-liter reservoir. Lime feed was controlled by the pH (9.8) (within about 9.6–10.0) of the clarifier effluent. A manually set constant supply of phenol solution was also supplied to the mixing reservoir by a metering pump.

Because the recycle water contained an average of only 0.036 mg/l of phenol, this water was spiked with sufficient phenol to give a final concentration of ~5 mg/l. This addition was made because an examination of discharge data from the blast-furnace outfall with once-through use of gas-cleaning water indicated that such a concentration would result at the extreme, that is if the phenol were completely retained in the scrubber water during recycling. Pretreated wastewater from the top of the clarifier was transferred to chlorination by a manually set metering pump.

The first-stage chlorinator was equipped with a stirring apparatus and had a working volume of 25 liters (l). a pH electrode in the vessel sensed the pH and transmitted a signal to a pH controller with on/off control over a pump supplying 3-normal sulfuric acid (3 N $H_2SO_4$) to this stage. The vessel also contained electrodes to read the pH and ORP of the solution. The entry point for the NaOCl solution was also located in this first-stage chlorination vessel. Water from this vessel overflowed into the second-stage chlorinator.

The second-stage chlorinator was also equipped with a stirring apparatus and had a working volume of 50 l. A pH electrode in the vessel sensed the pH and transmitted a signal to a pH controller with on/off control over a pump supplying 3 N $H_2SO_4$ to this stage. The vessel also contained an electrode to read the pH of the solution. An ORP electrode in the vessel fed a signal to a proportioning controller which controlled the rate of pumping NaOCl solution to the first-stage chlorinator. This signal was recorded on a continuous chart. A small side stream of water from the second-stage chlorination vessel was fed to an analyzer to monitor the treated water for free-chlorine residual. Chlorinated water was transferred by a manually set metering pump into the filtration and carbon-treatment train.

The filtration and carbon-treatment train was a skid-mounted series of four 0.13-m-ID (5-inch) by 1.8-m-tall (6-foot) Plexiglas columns. This column contained an 0.4-m (16-inch) bed of graded sand overlayed with 0.5 m (20 inches) of granular anthracite coal. Water from the filter column flowed down through a succession of three columns that contained 0.4-m (16-inch) beds of 12- by 40-mesh activated carbon. Each column was provided with valves to permit bypassing and back-washing each of the beds, and to sample effluent from each column. Pressure drop across each column was shown by pressure gauges.

Experimental Work

The wastewater feed to the treatment unit was taken from the hotwell, and samples were periodically analyzed to obtain an average composition of the water prior to treatment, Table II. At the start of the pilot-unit studies, water was conducted to the treatment system at a rate of ~1.24 liters per minute (l/min), and prior to contact with hypochlorite in the first-stage reactor, the pH was adjusted to 9.5 and phenol was added to give a concentration of ~5 mg/l. The water temperature was 38° to 42° C.

TABLE II

| | AM—N | CN—A | CN—T | PHENOL | SCN | CNO | CL | SO$_4$ | F | SS | PH | DS | COND |
|---|---|---|---|---|---|---|---|---|---|---|---|---|---|
| | 68. | .730 | 6.970 | .026 | 4.380 | 12.9 | 1229 | 238 | | 30 | 8.40 | 3686 | |
| | 105 | .390 | 6.630 | .025 | 6.920 | 12.9 | 1426 | 255 | 32.0 | 51 | 8.15 | 4127 | |
| | 50. | .330 | 5.790 | .020 | 6.200 | 8.83 | 1435 | 220 | 34.0 | 52 | 8.15 | 4198 | |
| | 88. | .250 | 3.660 | .018 | .660 | 11.8 | 1413 | 220 | 34.0 | 30 | 8.10 | 3990 | |
| | 70. | .350 | 4.120 | .038 | 2.450 | 9.20 | 1409 | 238 | 34.0 | 40 | 8.10 | 4067 | |
| | 67. | 3.91 | 9.900 | .046 | 7.570 | 8.70 | 948. | 190 | 30.0 | 32 | 8.30 | 3043 | |
| | 62. | 1.44 | 4.850 | .036 | 8.240 | 9.70 | 1032 | 238 | 30.0 | 24 | 8.30 | 3198 | |
| | 130 | .930 | 4.440 | | 5.720 | 15.5 | 1112 | 255 | 32.0 | 23 | 8.25 | | |
| | 128 | .550 | 3.410 | | 5.400 | 10.0 | 1163 | 255 | 30.0 | 24 | | | |
| | | .380 | 4.180 | | 6.870 | | 1070 | 285 | 32.0 | 26 | 8.30 | | 3500 |
| | 84. | 1.56 | 9.880 | .022 | 19.88 | 19.0 | 1170 | 253 | 36.0 | 10 | 8.40 | 4138 | |
| | 100 | 1.63 | 9.310 | .031 | 20.00 | 12.8 | 1166 | 270 | 39.0 | 41 | 8.45 | 4107 | |
| | 46. | 2.76 | 10.95 | .055 | 18.90 | 12.0 | 1325 | 240 | 34.0 | 30 | 8.55 | 4615 | 5000 |
| | 83. | .790 | 2.130 | .140 | 18.90 | 6.40 | 1050 | 320 | 25.0 | 35 | 7.55 | | |
| | 65. | 2.68 | 2.710 | .028 | 13.10 | 7.20 | 1435 | 305 | 23.0 | 27 | 7.80 | 3428 | 3600 |
| | 46. | 1.48 | 4.420 | .018 | .030 | 2.50 | 691. | 170 | 36.0 | 20 | 8.80 | 1883 | |
| | 46. | .348 | .350 | .018 | 2.420 | 8.70 | 700. | 220 | 17.0 | 2. | 7.75 | 2253 | 2200 |
| | 69. | .560 | 1.500 | .023 | 5.180 | 9.40 | 824. | 270 | 26.0 | 1. | 8.05 | | |
| | 53. | .410 | 1.270 | | 2.320 | | 700. | 220 | 23.0 | 17 | 8.00 | 2443 | |
| | | .780 | 1.400 | | 1.120 | | 720. | 185 | 23.0 | 14 | 8.00 | 2313 | |
| | | .160 | .960 | | 2.240 | | 770. | 208 | 29.0 | 1. | 7.80 | 2401 | 2950 |
| HIGH VALUE | 130 | 1.91 | 19.95 | .148 | 20.00 | 19.0 | 1435 | 305 | 39.0 | 52 | 8.55 | 4815 | 5000 |
| LOW VALUE | 46. | .16 | .35 | .018 | .03 | 2.5 | 691 | 170 | 17.0 | 1 | 7.55 | 1883 | 2200 |
| AVG. VALUE | 76 | 1.07 | 4.71 | .036 | 7.54 | 10.4 | 1087 | 236 | 29.9 | 25 | | 3368 | 3490 |
| STD. DEV. | 26 | .99 | 3.19 | .031 | 6.81 | 3.7 | 270 | 33 | 5.6 | 15 | | 873 | 1041 |
| NO. OBSER. | 18 | 21 | 21 | 15 | 21 | 17 | 21 | 21 | 20 | 21 | 20 | 15 | 5 |

*All in mg/l except conductivity, which is expressed in microsiemens.
AM—N: ammonia nitrogen; CN—A: cyanide amenable to chlorination; CN—T: cyanide total; SCN: thiocyanate; CNO: cyanate; CL: chlorine; SS: suspended solids; DS: dissolved solids.

The pH-adjusted water was contacted with hypochlorite in the first-stage reactor at a controlled pH 9.5 (±0.2) for twenty minutes, followed by second-stage reaction for twenty minutes at a controlled pH of 7.5 (±0.2), and a controlled ORP in the range (+)650 to (+)730 millivolts (mv). About 1.0 l/min of effluent from the second stage was conducted to the dual-media filter and then to the carbon columns for a superficial contact time of fourteen minutes and a linear velocity of 4 gallons per minute per square foot. Retention time in the first stage can be from about fifteen to twenty-five minutes.

Under these experimental conditions the pilot unit was operated continuously on a 3-shifts-per-day basis, five days per week. The pH and ORP in each stage and the free-chlorine residual were recorded at 15-minute intervals. The wastewater feed rates to the chlorination system and the carbon columns were checked at the start, once during, and at the end of each shift. NaOCl, NaOH, and $H_2SO_4$ usages were recorded for each shift.

For a two-month period, special sampling of the influent and effluents from the activated-carbon columns was conducted to obtain data on carbon performance. The samples collected for that study were the influent to the sand filter, the effluent from the sand filter, and effluents from each of the three carbon columns. When the equilibrium of the chlorination system was not upset, a composite of daily, 470-ml samples taken for four consecutive days was obtained. In some instances the samples represented fewer days. After collection, the samples were quenched to destroy residual chlorine by adding sodium bisulfite and $H_2SO_4$ (to a methyl orange end-point) and then stabilized by adding copper sulfate. The samples were analyzed for total organic carbon (TOC) and phenol. At the conclusion of the carbon-evaluation program, a portion of the carbon from the first carbon column was also submitted for a test for regenerability.

In subsequent tests appropriate changes in pilot unit design or operating conditions were made to study the following:
  (1) The effect of doubling second-stage retention time on the final CNO concentration.
  (2) System-control response to shock phenol (15 mg/l) loading.
  (3) Caustic pretreatment of wastewater to overcome a scaling problem.
  (4) System-control response to peak contaminant loading.
  (5) Feasibility of a nonmixing second stage.
  (6) Feasibility of system control by first-stage ORP.

The size of the second-stage chlorination vessel was increased to allow a retention time of forty minutes. During this period, the water was sampled for determination of its organic content by a gas chromatographic/mass spectrometric procedure. Samples of the effluent from the second stage revealed no chlorinated phenols present.

The samples were quenched with sodium arsenite and stabilized with copper sulfate and phosphoric acid. The unit had been in operation for 36 continuous hours and chlorinated effluent had been passed over the previously used carbon for 33 hours before collection was begun. Later, the phenol concentration was raised to ~15 mg/l by increasing the rate of the phenol solution pump.

To overcome a scaling problem noted in the earlier tests the pH (9.5) adjustment tank prior to chlorination was replaced by the pretreater and clarifier. This modification was used throughout subsequent studies, although scale inhibition is not an essential element of our invention. The incoming hotwell water was adjusted to a pH ~10.7, the precipitates were allowed to settle in the clarifier, and the clarified water was fed to the first-stage reactor which automatically adjusted and maintained the pH at 9.5 with 3 N $H_2SO_4$. To simulate a condition of peak contaminant loading, excess phenol, ammonia, thiocyanate, cyanate, and cyanide were added to the water by the use of the phenol solution pump to introduce a solution of phenol, ammonium hydroxide, potassium thiocyanate, ammonium cyanate, and sodium cyanide.

For a two-day test period during the study, the pilot unit was operated with the stirrer in the second stage not in operation while the controlling ORP electrode was relocated in the overflow from the second-stage reactor. The feasibility of controlling by first-stage ORP was studied over a five-day period when the controlling ORP electrode was relocated in the first-stage reactor.

Results and Discussion

Eighteen samples of untreated hotwell water gave the following average concentrations, in mg/l, of major chlorine demanders:

| | | |
|---|---|---|
| Ammonia nitrogen, | $NH_3$—N | 76 |
| Total cyanide, | CN—T | 4.71 |
| Cyanide amenable to chlorination, | CN—A | 1.07 |
| Phenol | | 0.036 |
| Cyanate, | CNO | 10.4 |
| Thiocyanate, | SCN | 7.54 |
| Total suspended solids, | TSS | 25 |

The ORP range of (+)650 to (+)750 mv was commensurate with obtaining a free- and combined-chlorine ($Cl_2$) residual of 3 to 16 mg/l, and a virtual removal of $NH_3$—N. We may use an ORP of from about 625 to about 750, preferably about 650–680.

The pilot unit was operated under the above conditions for eight consecutive weeks. Chemicals-usage data, residual free-chlorine concentration in the second-stage effluent, and total free-chlorine loading to the carbon columns were obtained. For 81 eight-hour shifts of stable performance (data obtained during periods of plant start-up and plant malfunction were excluded), the average and standard deviations ($\sigma$) for the above parameters were as follows:

| | |
|---|---|
| Average NaOH usage, g/l | 0.59, $\sigma$0.19 |
| Average $H_2SO_4$ usage, g/l | 0.644, $\sigma$0.212 |
| Average $Cl_2$ usage, g/l | 0.625, $\sigma$0.211 |
| Average free $Cl_2$ residual, mg/l | 8.69, $\sigma$4.87 |
| Total water chlorinated, l | 41,873 |
| Chlorinated water carbon treated, l | 30,144 |
| Total free $Cl_2$ loading to carbon columns, g | 259 |

The average analyses, expressed in mg/l, obtained on the chlorinated effluent (second-stage effluent) during the period of stable performance with twenty-minute retention time in both chlorination stages were:

| | |
|---|---|
| $NH_3$—N | 0.38 |
| CN—T | 0.90 |
| Phenol | 0.064 |
| CNO | 11.16 |
| TSS | 84 |
| Dissolved Solids (DS) | 5296 |
| Conductivity | 4900 microsiemens ($\mu$s) |

After the carbon treatment the following analytical results, expressed in mg/l, were obtained:

| | |
|---|---|
| NH$_3$—N | 0.31 |
| CN—T | 1.01 |
| Phenol | 0.049 |
| CNO | 11.1 |
| SCN | 0.12 |
| Chloride (Cl) | 1866 |
| Sulfate (SO$_4$) | 925 |
| Fluoride (F) | 29 |
| TSS | 4 |
| Dissolved Solids (DS) | 5198 |
| Conductivity | 4780 μs |
| Residual Cl$_2$, total | 0.11 |
| free | 0.08 |

The samples of chlorinated effluent and carbon-column effluent were analyzed by gas chromatographic and mass spectrographic (GC/MS) procedures. Results of analyses are given below.

1. Chlorination Effluent (Influent to Filter Carbon Column)

| Compound Found | Concentration, parts per billion (ppb) |
|---|---|
| Volatiles | |
| Chloroform | 10 |
| Bromodichloromethane | 62 |
| Unidentified | 7 |
| Dibromochloromethane | 185 |
| Unidentified | 8 |
| Bromoform | 445 |
| Extractables | |
| p-Benzoquinone | 5 |
| Dibromoiodomethane | <1 |
| Unidentified | 1 |
| Unidentified | 1 |
| Diethyl phthalate | 2 |
| 9-Flourenone | 2 |
| Xanthone | 2 |
| Dibutyl phthalate | 1 |
| 9, 10-Anthraquinone | <1 |
| Dioctyl phthalate | 6 |
| Phenolic Compounds | Not detected at 1 ppb level |

2. Effluent from Carbon Columns

| Compound Found | Concentration, ppb |
|---|---|
| Volatiles | |
| Chloroform | 55 |
| Bromodichloromethane | 5 |
| Extractables | |
| Diethyl phthalate | <1 |
| Dibutyl phthalate | 1 |
| Butyl benzyl phthalate | <1 |
| Dioctyl phthalate | 3 |

The absence of chlorinated phenols (included in the analysis for phenolic compounds) at this stage is very significant. They do not need to be removed by the carbon since they are not present in the activated carbon influent.

The increase in chloroform (CHCl$_3$) concentration in the effluent from the carbon beds over that found in the influent is presumed to be due to its elution from the carbon by other highly halogenated compounds, such as bromoform. Accordingly, the adsorption capacity of the carbon for CHCl$_3$ has been reached and desorption and replacement by other halogenated methanes is occurring. However, the 60 ppb of total halomethanes found in effluent water during this elution is still well under the tentative EPA standard for drinking water of 100 ppb.

The bromine compounds may have formed from bromine impurities present in the hypochlorite being used or from bromide salts present in the wastewater or lake water. The presence of phthalate esters may derive from Tygon tubing in the sample-collection lines and in the peristaltic pump to the mixed media filter, or their occurrence in these small amounts in the waters of Lake Michigan. Although no phenolic compounds were found in the chlorinated effluent by GC/MS analysis, 0.025 mg/l (25 ppb) was determined by the wet chemical 4-amino-antipyrene (4-AP) method, a close agreement with the 0.030 mg/l measured just prior to this sampling at the pilot unit by U.S. Steel personnel using the 4-AP method. U.S. Steel analyses showed less than 0.005 mg/l phenol in the carbon-treated effluent in this sampling period.

The retention time in the second stage was changed to double its original value of twenty minutes. The forty-minute retention time was to allow sufficient time for the hydrolysis of CNO to ammonia and for the break-point chlorination of the ammonia formed. Concurrently, the wastewater was spiked with 15 mg/l phenol to study the effect of peak phenol loading on the treatment process. The changes did not affect the control mechanism of the pilot unit. The average (13 shifts) chemicals consumption during the forty-minute second-stage retention time operations was as follows:

| | |
|---|---|
| Average NaOH usage, g/l | 0.405, σ0.056 |
| Average H$_2$SO$_4$ usage, g/l | 0.439, σ0.195 |
| Average Cl$_2$ usage, g/l | 0.540, σ0.050 |
| Average free-Cl$_2$ residual after chlorination, mg/l | 9.15, σ3.49 |
| Total water chlorinated, l | 7,169 |
| Total chlorinated water carbon-treated, l | 5,513 |
| Total free-Cl$_2$ loading to carbon column, g | 48 |

We may employ a retention time in the second stage of at least thirty minutes; more than fifty minutes retention time will probably not be economic.

The lower chemicals consumption during the test compared with that obtained in the twenty-minute-retention test is explained by the fact that the No. 10 blast furnace was not operating, but its gas-scrubbing-water flow was continuing, thereby reducing the contaminant loading to the recycle system.

The chlorinated effluent after forty-minute second-stage retention showed the following average analysis, in mg/l:

| | |
|---|---|
| NH$_3$—N | 0.21 |
| Phenol | 0.032 |
| CNO | 3.11 |
| TSS | 23 |
| DS | 4178 |
| Conductivity | 4000 μs |

After final carbon treatment, the following average analyses, expressed in mg/l, were obtained:

| | |
|---|---|
| NH$_3$—N | 0.26 |
| CN—T | 0.95 |
| Phenol | 0.007 |
| CNO | 2.11 |
| SCN | 0.03 |
| Cl | 1413 |
| SO$_4$ | 616 |
| F | 25 |
| TSS | 3 |
| DS | 4161 |

| -continued | |
|---|---|
| Conductivity | 3800 μs |

Under suddenly applied peak phenol loading (sudden rise to ~15 mg/l), the residual phenol after treatment did not exceed the values obtained when the initial phenol concentration in the water was ~5 mg/l. No control problem was observed as a result of the peak phenol loading.

The extended (forty-minute) Stage 2 retention time reduced the residual cyanate level by 80% of that found during the twenty-minute retention time. The 2.11 mg/l of residual cyanate has an $NH_3$—N equivalent of 0.70 mg/l. Thus, added to the 0.26 mg/l of $NH_3$—N found above (sample not acid stabilized before analysis), a total of 0.96 mg/l of $NH_3$—N would obtain when the sample is acid-stabilized before analysis in accordance with the standard methods.

There was effective removal across the carbon beds of total organic carbon (TOC) and phenol. TOC was reduced to a few mg/l and phenol to less than 0.005 mg/l, Table III. With respect to these components, the carbon had not exceeded its effective adsorption capacity. The physical characteristics of thermally regenerated carbon showed that the carbon was reusable after regeneration, Table IV.

TABLE III

Carbon Column Performance
(Phenol Concentration Before Chlorination = −5 mg/l)

| Date | Influent | | Sand Effluent | | Column 1 | | Column 2 | | Column 3 | |
|---|---|---|---|---|---|---|---|---|---|---|
|  | TOC | φOH | TOC | φOH | TOC | φOH | TOC | φOH | TOC | φOH |
| 4/20 | 51 | 0.054 | 19 | 0.055 | 39 | 0.035 | 33 | 0.026 | 13 | 0.016 |
| 4/28–4/29 | 25 | 0.016 | 21 | 0.015 | 17 | 0.021 | 13 | <0.005 | 10 | <0.005 |
| 5/03–5/06 | 27 | 0.009 | 15 | 0.009 | 13 | 0.005 | 12 | <0.005 | 11 | <0.005 |
| 5/17–5/19 | 13 | 0.014 | 14 | 0.020 | 12 | <0.005 | 8 | <0.005 | 10 | <0.005 |
| 5/24–5/26 | 9 | 0.010 | 6 | <0.005 | 5 | <0.005 | 4 | <0.005 | 2 | <0.005 |
| 6/20–6/23[a] | ND[b] | 0.115 | ND | 0.009 | ND | <0.005 | ND | <0.005 | ND | <0.005 |

[a]Phenol concentration before chlorination = −15 mg/l.
[b]Not determined.
TOC = Total organic carbon concentration, mg/l.
φOH = Phenol concentration, mg/l.

TABLE IV

Characteristics of Reactivated Carbon

Reactivation Parameters

| Apparent density, g/cc | 0.493 |
|---|---|
| Ash, % | 5.24 |
| Iodine No. | 765 |
| CCl₄ No. | 47.8 |
| Butane No., cm³/g | 0.335 |
| Butane Retention | 0.150 |
| Volume yield, % | 96.5 |
| Reactivation time, minutes | 10 |

Serious scale-formation problems in the pilot unit led to the conclusion that blowdown should be softened prior to treatment in order for the use of the invention to be economic and for ease of maintenance. Softening typically involves precipitating hardness salts by pretreatment with NaOH or lime followed by clarification of the treated blowdown. The average NaOH usage for pretreatment (pH adjustment to between pH 10.5 and 11.0) of the wastewater prior to chlorination was determined during 45 shifts of normal operation. During that time, with second-stage ORP control, a phenol loading of 5 mg/l, and a 40-minute Stage 2 retention time, no scaling problems were observed. The average chemicals consumption for treating the water was as follows:

| Average NaOH usage, g/l | 0.98 |
|---|---|
| Average Cl₂ usage, g/l | 0.526 |
| Average Stage 1 H₂SO₄ usage, g/l | 0.423 |
| Average Stage 2 H₂SO₄ usage, g/l | 0.147 |

A comparison of the average analyses for clarified wastewater, first-stage chlorination effluent, and second-stage effluent during this period is shown in Table V. The data show that $NH_3$—N, phenol, and SCN are 95 to 98% destroyed in the first-stage chlorination, whereas 84% of CNO is removed, requiring second-stage chlorination to achieve 96% removal.

TABLE V

Water Quality* of Clarified Blowdown
Before and After Chlorination
Analysis, mg/l

| Compound | Clarified Blowdown | Stage 1 Effluent | Stage 2 Effluent |
|---|---|---|---|
| $NH_3$—N | 65.3 | 0.95 | 0.34 |
| CN—T | 1.45 | 0.84 | 0.82 |
| phenol | 3.68 | 0.058 | 0.036 |
| CNO | 17.30 | 2.80 | 0.62 |
| SCN | 1.98 | 0.10 | 0.068 |
| TSS | 90. | 21. | 5. |

*Average of 15 daily analyses

Because very high contaminant concentrations might occur in plant operations on some occasions, it was desired to test the control response of the system to unusually high loads. During seven operating shifts, the water was spiked with contaminants to give a peak concentration, in mg/l, as follows: $NH_3$—N, ~370; phenol, ~16; CN—T, ~16; SCN, ~60; and CNO, ~120. Observation of the control (ORP) recorder for closeness of control showed that there was no difficulty in responding to the higher concentrations, even when the increase (or decrease) happened suddenly (shock loading). The second-stage effluent-water quality was comparable with that obtained during normal contaminant loads except for residual CN—T which was 3.85 mg/l. This high residual CN—T suggests that some of the added simple cyanide was converted to complex cyanide not amenable to chlorination. These analytical data are summarized in Table VI.

TABLE VI

Water Quality* of Clarified Blowdown Before and After Chlorination
(Wastewater Spiked to Simulate Peak Contaminant Loading)
Analysis, mg/l

| Compound | Clarified Blowdown | Stage 1 Effluent | Stage 2 Effluent |
|---|---|---|---|
| $NH_3$—N | 378.0 | 2.70 | 0.63 |
| CN—T | 14.3 | 6.82 | 3.58 |
| phenol | 17.6 | 0.080 | 0.046 |
| CNO | 116.0 | 3.01 | 0.03 |
| SCN | 49 | 0.034 | 0.034 |
| TSS | 75 | 32 | 22 |

*Single analysis during the peak load

When the apparatus was operated without mixing in the second stage, or again when system control was attempted via the first-stage ORP, control of the system was not achieved. The lack of control was evidenced on the control recorder as a constantly meandering ORP signal. In addition, analyses of the first- and second-stage effluents showed higher than normal phenol concentrations. We consider mixing or agitation to be essential to the achievement of practical results.

A later pilot study performed at a second mill containing a blast-furnace water-recycle system illustrates that effluents with lower residual CN—T levels can be produced. Table VII summarizes the analyses of periodic samples of untreated hotwell water and includes average concentrations, range, and standard deviations for all the components analyzed.

TABLE VII

ANALYSIS OF HOTWELL WATER (mg/l)

| | HDNS* | CN—T | CNO | SCN | AM—N | PHEN | CL | $SO_4$ | FLUO | DS | SS | ALK** | PH | CN—A |
|---|---|---|---|---|---|---|---|---|---|---|---|---|---|---|
| | 454.0 | .64 | 10.9 | 13.70 | 47.00 | .004 | 142. | 80.0 | 28. | 765. | 16. | 456. | 8.00 | .480 |
| | 442.0 | 1.1 | 5.00 | 11.60 | 52.33 | .003 | 152. | 82.0 | 24. | 737. | 16. | 440. | 7.00 | 1.02 |
| | 226.0 | 1.1 | 9.10 | 13.70 | 45.60 | .006 | 149. | 83.0 | 24. | 745. | 22. | 405. | 7.83 | .680 |
| | 430.0 | .50 | 5.70 | 14.50 | 59.10 | .008 | 145. | 86.0 | 24. | 742. | 10. | 456. | 7.90 | .260 |
| | 430.0 | .73 | 20.6 | 13.90 | 64.00 | .008 | 145. | 94.0 | 23. | 761. | 9.0 | 472. | 7.70 | .730 |
| | 422.0 | .42 | 12.5 | 15.00 | 66.00 | .012 | 145. | 102. | 23. | 681. | 9.0 | 448. | 7.90 | .420 |
| | 424.0 | .50 | 17.5 | 13.60 | 63.00 | .015 | 145. | 95.0 | 23. | 710. | 25. | 438. | 7.70 | .070 |
| | 436.0 | 1.6 | 4.10 | 14.30 | 58.00 | .014 | 147. | 95.0 | 22. | 739. | 4.0 | 466. | 7.70 | .360 |
| | 452.0 | 1.7 | 12.4 | 13.60 | 60.00 | .029 | 152. | 78.0 | 12. | 762. | 7.0 | 502. | 8.10 | 1.55 |
| | 435.0 | 1.1 | 9.40 | 15.20 | 53.00 | .024 | 152. | 80.0 | 22. | 772. | 9.0 | 523. | 7.80 | .968 |
| | 426.0 | .15 | 6.00 | 13.40 | 69.00 | .004 | 154. | 116. | 19. | 765. | 5.0 | 515. | 8.10 | .040 |
| | 419.0 | .44 | 8.40 | 11.40 | 78.00 | .026 | 149. | 16. | 16. | 773. | 2.0 | 470. | 7.60 | .390 |
| | 432.0 | .40 | 5.80 | 11.90 | 78.00 | .016 | 163. | 108. | 12. | 714. | 15. | 507. | 7.60 | .340 |
| | 434.0 | .17 | 14.3 | 9.600 | 74.00 | .018 | 174. | 108. | 17. | 787. | 11. | 480. | 7.70 | .090 |
| | 454.0 | .37 | 15.4 | 12.10 | 70.00 | .025 | 160. | 126. | 16. | 811. | 20. | 460. | 7.70 | .200 |
| | 474.0 | .32 | 6.00 | 10.00 | 68.00 | .039 | 174. | 117. | 17. | 771. | 11. | 472. | 7.80 | .300 |
| HIGH VALUE | 474 | 1.71 | 20.60 | 15.20 | 76.00 | .039 | 174 | 126 | 28.0 | 811 | 25 | 523 | 8.1 | 1.55 |
| LOW VALUE | 226 | .15 | 4.10 | 9.60 | 45.60 | .003 | 142 | 78 | 12.0 | 601 | 2 | 405 | 7.0 | .04 |
| AVG. VALUE | 424 | .71 | 10.37 | 12.98 | 62.06 | .016 | 153 | 98 | 20.2 | 753 | 12 | 469 | 7.8 | .49 |
| STD. DEV. | 55 | .49 | 4.77 | 1.69 | 9.28 | .010 | 10 | 16 | 4.7 | 33 | 7 | 31 | .3 | .41 |
| NO. OBSER. | 16 | 16 | 16 | 16 | 16 | 16 | 16 | 16 | 16 | 16 | 16 | 16 | 16 | 16 |

*hardness mg/l as $CaCO_3$
**mg/l as $CaCO_3$

Chlorination and carbon treatment produced an effluent containing the following average concentrations, expressed in mg/l where applicable:

| $NH_3$—N | 0.50 |
|---|---|
| CN—T | 0.04 |
| Phenol | 0.002 |
| SCN | 0.10 |
| CNO | 3.04 |
| Cl | 1188 |
| $SO_4$ | 691 |
| F | 12.2 |
| SS | 3 |
| DS | 3712 |
| Conductivity | 5951 μs |
| pH | 7.70 |
| Total $Cl_2$ residual | Not detected (<0.01) |

Thus, it may be seen that our invention comprises a method of controlling breakpoint chlorination comprising chlorinating an $NH_3$—N-containing solution maintained at a pH of about 8.5 to about 10, preferably about 9–9.5, in an initial vessel by the addition of a chlorinating compound in response to the redox potential measured in a second vessel, flowing said solution from said initial vessel to said second vessel, maintaining the pH in the second vessel from about 6 to about 8, preferably about 7–7.5, to maintain the redox potential of the second vessel at a value of at least +625 but no more than about +750 millivolts.

The ORP control points described herein are not meant to be construed as limiting, but rather are characteristics of the water being treated.

We claim:

1. Method of treating blast furnace and other wastewater containing ammonia, cyanide and phenol by breakpoint chlorination comprising chlorinating said wastewater maintained at a pH of about 8.5 to about 10 in an initial vessel by the addition of a chlorinating compound in response to the redox potential measured in a second vessel, flowing said wastewater from said initial vessel to said second vessel, mixing said wastewater, and maintaining the pH in the second vessel from about 6 to about 8, and the redox potential of the second vessel at a value of from about +625 millivolts to about +750 millivolts.

2. Method of claim 1 followed by passing said wastewater through activated carbon to remove residual contaminants.

3. Method of claim 1 in which the retention time of the wastewater in the second vessel is at least about thirty minutes.

4. Method of claim 1 in which the pH of the first vessel is maintained from about 9–9.5.

5. Method of claim 1 in which the pH of the second vessel is maintained from about 7–7.5.

* * * * *